(12) United States Patent
Seeger (10) Patent No.: US 12,224,803 B2
(45) Date of Patent: Feb. 11, 2025

(54) CONTROL MODULE, OPTICAL SIGNAL GENERATOR MODULE, AND RF-OVER-FIBER SYSTEM

(71) Applicant: Rohde & Schwarz GmbH & Co. KG, Munich (DE)

(72) Inventor: Julius Seeger, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 186 days.

(21) Appl. No.: 18/074,324

(22) Filed: Dec. 2, 2022

(65) Prior Publication Data

US 2024/0195508 A1 Jun. 13, 2024

(51) Int. Cl.
*H04B 10/516* (2013.01)
*G02F 1/01* (2006.01)
*H04B 10/2575* (2013.01)

(52) U.S. Cl.
CPC ......... *H04B 10/516* (2013.01); *G02F 1/0118* (2013.01); *H04B 10/2575* (2013.01); *H04B 2210/006* (2013.01)

(58) Field of Classification Search
CPC ........ H04B 10/50575; H04B 10/50595; H04B 10/516
See application file for complete search history.

(56) References Cited

U.S. PATENT DOCUMENTS

| | | |
|---|---|---|
| 6,204,954 B1 | 3/2001 | Nagarajan |
| 6,687,451 B1 | 2/2004 | Sikora |
| 2012/0155880 A1* | 6/2012 | Nishimoto ............ G02F 1/2257 398/79 |
| 2013/0230328 A1* | 9/2013 | Fan .................. H04B 10/25759 398/115 |
| 2023/0388016 A1* | 11/2023 | Padmaraju ............ G02F 1/0123 |

\* cited by examiner

*Primary Examiner* — Shi K Li
(74) *Attorney, Agent, or Firm* — CHRISTENSEN O'CONNOR JOHNSON KINDNESS PLLC (57) ABSTRACT

A control apparatus for generating a control signal for an electro-optic modulator is described. The control apparatus includes an RF signal source being configured to generate a radio frequency (RF) signal. The control apparatus further includes an amplitude adjustment circuit being configured to adjust an amplitude of the RF signal, thereby obtaining an adjusted RF signal. The control apparatus further includes a DC signal source being configured to generate a direct current (DC) signal. The control apparatus further includes a superposition circuit being configured to superimpose the adjusted RF signal and the DC signal, thereby obtaining the control signal for the electro-optic modulator. The control apparatus further includes a control circuit, wherein the control circuit is configured to receive at least one frequency parameter associated with the electro-optic modulator. The at least one frequency parameter includes a frequency multiplication factor and/or a target modulation frequency. The control circuit is configured to control the DC signal source to adapt a voltage of the DC signal based on the at least one frequency parameter received. Further, an optical signal generator apparatus and an RF-over-fiber system are described.

20 Claims, 4 Drawing Sheets

Fig. 7

CONTROL MODULE, OPTICAL SIGNAL GENERATOR MODULE, AND RF-OVER-FIBER SYSTEM

FIELD OF THE DISCLOSURE

Embodiments of the present disclosure generally relate to a control module for generating a control signal for an electro-optic modulator. Embodiments of the present disclosure further relate to an optical signal generator module, and to an RF-over-fiber system.

BACKGROUND

In the state of the art, radio frequency over fiber ("RFoF") networks are known that are used to transmit data at high speed over large distances, as optical transmission of high-frequency (HF) signals is beneficial due to its very low loss per distance. Therefore, those networks are typically used when HF signals have to be transmitted over distances of several meters, between different buildings or even over distances of several hundred meters. In general, RFoF networks provide high bandwidth, low-loss communication links, while delivering the radio frequency signals at the optimal wavelength.

Typically, an optical signal is generated and modulated with an RF signal by an electro-optic modulator, thereby obtaining a modulated optical signal that carries the information to be transmitted.

It is known that the frequency of the modulation can be multiplied by operating the electro-optic modulator in a non-linear region, such that the modulates optical signal comprises harmonics. However, in order to stabilize the phase and amplitude of the modulated optical signal, usually a rather sophisticated control loop with two controlled variables is necessary for the RF signal, which increases the costs of manufacturing the electro-optic modulator.

Thus, there is a need for a control module, an optical signal generator module, and an RF-over-fiber system that allow for an easier stabilization of the phase and amplitude of the modulated optical signal.

SUMMARY

Embodiments of the present disclosure provide a control apparatus, such as a module, for generating a control signal for an electro-optic modulator. In an embodiment, the control module comprises an RF signal source being configured to generate a radio frequency (RF) signal. The control module also comprises an amplitude adjustment circuit configured to adjust an amplitude of the RF signal, thereby obtaining an adjusted RF signal. The control module further comprises a DC signal source configured to generate a direct current (DC) signal. The control module further comprises a superposition circuit configured to superimpose the adjusted RF signal and the DC signal, thereby obtaining the control signal for the electro-optic modulator. The control module further comprises a control circuit, wherein the control circuit is configured to receive at least one frequency parameter associated with the electro-optic modulator. The at least one frequency parameter comprises a frequency multiplication factor and/or a target modulation frequency. The control circuit is configured to control the DC signal source to adapt a voltage of the DC signal based on the at least one frequency parameter received.

Therein and in the following, the term "multiplication factor" is understood to denote the factor by which the frequency of the control signal is multiplied when an optical signal is modulated by the control signal by the electro-optic modulator, thereby obtaining a modulated optical signal. Therein, the modulated optical signal corresponds to the output signal of the electro-optic modulator.

Further, the term "target modulation frequency" is understood to denote the desired frequency of the RF information comprised in the modulated optical signal, which is equal to the frequency of the control signal (i.e. the frequency of the RF signal generated by the RF signal source) multiplied by the multiplication factor.

In general, the multiplication factor applied to the frequency of the control signal by the electro-optic modulator depends on the amplitude of the adjusted RF signal and on the voltage of the DC signal.

The control module according to embodiments of the present disclosure is based on the finding that there exist certain combinations of amplitudes of the adjusted RF signal and voltages of the DC signal that result in a stable phase and amplitude of the modulated optical signal.

Choosing such a combination allows for significantly reducing the complexity of the control module. In some embodiments, once a starting combination of amplitude of the adjusted RF signal and voltage of the DC signal is set, it is only necessary to control the DC signal source to adapt a voltage of the DC signal based on the at least one frequency parameter received in order to guarantee a stable phase and amplitude of the modulated optical signal.

Therein, the initial values of the amplitude of the adjusted RF signal and the voltage of the DC signal determine the multiplication factor applied by the electro-optic modulator, and thus the frequency of the RF information comprised in the modulated optical signal.

Instead of a high frequency two-dimensional active level control for the RF signal that is necessary in the state of the art, a low-frequency one-dimensional control of the voltage of the DC signal can be used by the control module according to the present disclosure, which significantly reduces the manufacturing costs.

According to an aspect of the present disclosure, the RF signal is, for example, at least one of a periodic signal, a non-modulated signal, or a monochromatic signal. Accordingly, the RF signal may serve as a reference signal for conducting measurements by a measurement instrument, as will be described in more detail below. For example, the RF signal may be a local oscillator signal, for example a sine-shaped local oscillator signal.

According to another aspect of the present disclosure, the control circuit is, for example, configured to determine an allowable voltage range for the DC signal based on the at least one frequency parameter received. In general, the allowable voltage range corresponds to a stable amplitude and phase of the modulated optical signal, wherein the RF information comprised in the modulated optical signal has a desired frequency. Thus, the control circuit may control the DC signal source to generate the DC signal with its voltage being in the allowable voltage range, such that a stable amplitude and phase of the modulated optical signal is obtained, and such that the RF information comprised in the modulated optical signal has the desired frequency.

In an embodiment of the present disclosure, the control circuit is configured to determine the allowable voltage range based on the amplitude of the adjusted RF signal. Thus, for a given amplitude of the adjusted RF signal, the control circuit may control the DC signal source to generate the DC signal with its voltage being in the allowable voltage range, such that a stable amplitude and phase of the modulated optical signal is obtained, and such that the RF information comprised in the modulated optical signal has the desired frequency.

In a further embodiment of the present disclosure, the allowable voltage range is configured such that a phase of an output signal of the electro-optic modulator is stable over the allowable voltage range. In other words, if the voltage of the DC signal varies within the allowable voltage range, there are no significant changes to the phase and amplitude of the modulated optical signal resulting from this variation.

Accordingly, within the allowable voltage range, the voltage of the DC signal can be set such that an optimal output power is obtained for the modulated optical signal.

Further, within the allowable voltage range, the voltage of the DC signal can be adapted in order to stabilize the amplitude of the modulated optical signal, which is more sensitive to changes of the amplitude of the adjusted RF signal and to changes of the voltage of the DC signal than the phase of the modulated optical signal.

In some embodiments, the allowable voltage range may be configured such that a power of an output signal of the electro-optic modulator is larger than a predefined threshold over the allowable voltage range. For example, the power of the modulated optical signal may be larger than or equal to 75% of the maximum possible power, for example larger than or equal to 85% of the maximum possible power, for example at least 90% or 95% of the maximum possible power.

According to an aspect of the present disclosure, the frequency multiplication factor is, for example, an integer. In other words, the RF signal or rather the RF information comprised in the modulated optical signal (i.e. the output signal of the electro-optic modulator) may be an harmonic of the control signal. For example, the multiplication factor may be an integer greater than or equal to 2, and smaller than or equal to 10. However, in principle also larger harmonics are possible.

In some embodiments, the control circuit is configured to control the RF signal source to adapt a frequency of the RF signal such that a frequency of the control signal multiplied by the multiplication factor is equal to the target modulation frequency. In other words, the control circuit may control the RF signal source such that the target modulation frequency corresponds to the fundamental or a predefined harmonic of the RF signal.

In an embodiment of the present disclosure, the control circuit is configured to control the amplitude adjustment circuit based on the at least one frequency parameter received. In some embodiments, the control circuit may set an initial value of the amplitude of the adjusted RF signal based on the at least one frequency parameter received, i.e. based on the (desired) frequency multiplication factor and/or based on the target modulation frequency.

Another aspect of the present disclosure provides that the control circuit is, for example, configured to determine an allowable amplitude range for the RF signal based on the at least one frequency parameter received. In general, the allowable voltage range corresponds to a stable amplitude and phase of the modulated optical signal, wherein the RF information comprised in the modulated optical signal has a desired frequency. Thus, the control circuit may set the initial amplitude of the adjusted RF signal to be within the allowable amplitude range, such that a stable phase and amplitude of the modulated optical signal is guaranteed.

In some embodiments, the allowable amplitude range is configured such that a resulting amplitude of an output signal of the electro-optic modulator is equal to at least 75% of a maximum possible amplitude of the output signal. For example, the power of the modulated optical signal may be larger than or equal to 85% of the maximum possible power, for example at least 90% or 95% of the maximum possible power.

The RF signal source may be established as a voltage controlled oscillator. However, it is to be understood that the RF signal source may be established as any other suitable type of oscillator.

In a further embodiment of the present disclosure, the amplitude adjustment circuit comprises at least one of an attenuator, or an amplifier, for example a voltage-controlled variable attenuator (VVA) and/or a variable gain amplifier (VGA). Accordingly, the amplitude adjustment circuit may amplify and/or attenuate the RF signal in order to obtain the adjusted RF signal.

According to an aspect of the present disclosure, the RF signal source is, for example, integrated in a direct signal synthesizer (DDS) circuit. Accordingly, the DDS circuit is configured to generate the RF signal. Further, the DDS circuit may be controlled by the control circuit to generate the RF signal to have the properties described above.

For example, the RF signal source and the amplitude adjustment circuit may be integrated in the DDS circuit. Accordingly, the DDS circuit may be configured to generate the adjusted RF signal. Further, the DDS circuit may be controlled by the control circuit to generate the adjusted RF signal to have the properties described above.

The superposition circuit may comprise a capacitance that is connected with the amplitude adjustment circuit so as to receive the adjusted RF signal. Due to the capacitance, undesired DC components of the adjusted RF signal are suppressed. Thus, the control signal can be provided with enhanced accuracy.

In an embodiment of the present disclosure, the superposition circuit comprises an inductance that is connected with the DC signal source so as to receive the DC signal. Due to the inductance, undesired alternating current (AC) components of the DC signal are suppressed. Thus, the control signal can be provided with enhanced accuracy.

According to another aspect of the present disclosure, the control module comprises, for example, a control loop for setting the voltage of the DC signal. In other words, the voltage of the DC signal is controlled by the control loop, such that a particularly stable phase and amplitude is guaranteed for the modulated optical signal.

In some embodiments, the modulated optical signal may be fed back into the control loop, i.e. the modulated optical signal may be received by an optical receiver, thereby generating an electrical signal corresponding to the modulated optical signal. The control circuit may analyze the electrical signal, for example the phase and/or amplitude of the electrical signal, and may set the voltage of the DC signal based on the analysis of the electrical signal.

Embodiments of the present disclosure further provide an optical signal generator module. In an embodiment, the optical signal generator module comprises a control module described above, a light source, and an electro-optic modulator. The light source is configured to generate an optical signal. The electro-optic modulator is configured to modulate the optical signal based on the control signal provided by the control module, thereby obtaining a modulated optical signal.

Regarding the further advantages and properties of the optical signal generator module, reference is made to the explanations given above with respect to the control module, which also hold for the optical signal generator module and vice versa.

For example, the light source may be established as a laser or as an LED.

According to an aspect of the present disclosure, the electro-optic modulator is, for example, a Mach-Zehnder modulator (MZM). However, it is to be understood that the electro-optic modulator may established as any other suitable type of electro-optic modulator.

Embodiments of the present disclosure further provide an RF-over-fiber system. In an embodiment, the RF over fiber system comprises an optical signal generator module described above.

Regarding the further advantages and properties of the RF-over-fiber system, reference is made to the explanations given above with respect to the control module and the optical signal generator module, which also hold for the RF-over-fiber system and vice versa.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed.

Figure 1:
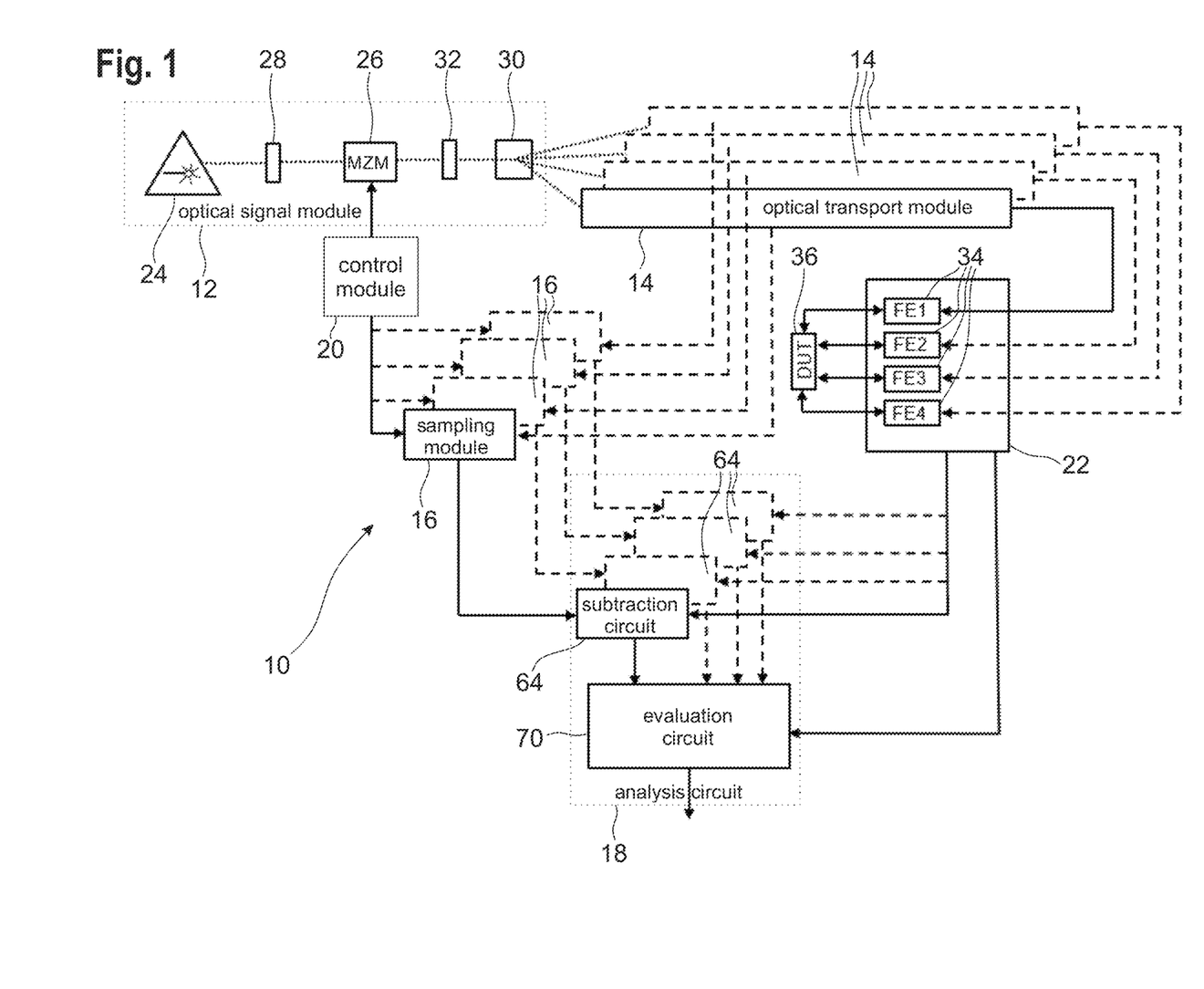
FIG. 1 schematically shows an RF-over-fiber system according to an embodiment of the present disclosure.

FIG. 1 schematically shows an example embodiment of an RF-over-fiber (RFoF) system 10. The RFoF system 10 comprises an optical signal module 12, a plurality of optical transport modules 14, a plurality of sampling modules 16, an analysis circuit 18, a control module 20, and a measurement instrument 22. It is noted that the RFoF system 10 may also comprise only a single optical transport module 14 and/or only a single sampling module 16.

In the following, it is assumed without restriction of generality that the RFoF system 10 comprises at least two optical transport modules 14 and at least two sampling modules 16, for example four or eight, respectively.

In general, the optical signal module 12 is configured to output a modulated optical signal, and to forward the modulated optical signal to the optical transport modules 14. More precisely, the optical signal module 12 is capable of amplitude modulating an optical signal while being phase- and/or frequency-shifted, thereby outputting the modulated optical signal.

The optical signal module 12 comprises a light source 24, which may be established by a laser in the shown embodiment. The optical signal module 12 further comprises an electro-optic modulator 26 that is configured to receive light output by the light source 24 as well as a control signal generated by the control module 20. The electro-optic modulator 26 is configured to modulate the light output by the light source 24 based on the control signal received from the control module 20.

In the following, it is assumed without restriction of generality that the electro-optic modulator 26 is established by a Mach-Zehnder modulator (MZM). However, it is to be understood that the explanations given hereinafter likewise apply to any other type of suitable electro-optic modulator, possibly with appropriate changes such as the transfer function of the electro-optic modulator 26.

In some embodiments, the electro-optic modulator 26 may be driven with a bias voltage to maximize the nonlinearity of a transfer function as to create harmonics, as will be described in more detail below.

Further, a polarization control 28 is located between the light source 24 and the electro-optic modulator 26, thereby ensuring that the electro-optic modulator 26 receives an optical signal having a defined polarization. For instance, the polarization control 28 may be established by a wave plate, for instance a lambda/2 wave plate.

The optical signal module 12 further comprises a beam distributor 30 that is provided downstream of the electro-optic modulator 26. The beam distributor 30 is connected to the electro-optic modulator 26, so as to receive the amplitude-modulated optical signal that is outputted by the electro-optic modulator 26. The beam distributor 30 is configured to split the amplitude-modulated optical signal, such that the amplitude-modulated optical signal is forwarded to the optical transport modules 14, for example to all optical transport modules 14.

In the shown embodiment, another polarization control 32 is provided between the electro-optic modulator 26 and the beam distributor 30, which may be used to ensure that no polarization effects introduced by the optical signal module 12, for example the electro-optic modulator 26, have an impact on the further processing.

Alternatively, only one of both polarization controls 28, 32 or even none of the polarization controls 28, 32 is provided.

In general, the optical transport module 14 is configured to transport the amplitude-modulated optical signal to the measurement instrument 22, wherein the amplitude-modulated optical signal is converted into an electric reference signal in the vicinity of the measurement instrument 22, as will be described in more detail below.

The measurement instrument 22 may, e.g., be established as a vector network analyzer with at least one external frontend 34. In some embodiments, the measurement instrument 22 may comprise a plurality of frontends 34 (labelled with "FE1" to "FE4" in FIG. 1), wherein each of the frontends 34 is connected with one of the optical transport modules 14, respectively. Accordingly, each of the frontends 34 receives an electrical signal corresponding to the amplitude-modulated optical signal via one of the optical transport modules 14, respectively.

It is noted that while the frontends 34 are illustrated to be integrated into the measurement instrument 22, the frontends 34 may alternatively be established as external frontends, i.e. as frontends that are established separately from the measurement instrument 22.

The frontends 34 are further connected with a device under test 36. The frontends 34 receive signals from the device under test 36, and the frontends 34 generate measurement signals based on the signals received from the device under test 36 and based on the reference signals received via the optical transport modules.

The measurement instrument 22 is configured to generate measurement data based on the measurement signals provided by the frontends 34. The measurement data may comprise a measured phase, i.e. phase data, for example phases of S parameters associated with the device under test 36. The measurement data is forwarded to the analysis circuit 18.

In general, the analysis circuit 18 is configured to correct the measurement data obtained by the measurement instrument 22 based on an electric correction signal received from the sampling modules 16, which will be described in more detail hereinafter.

Figure 2:
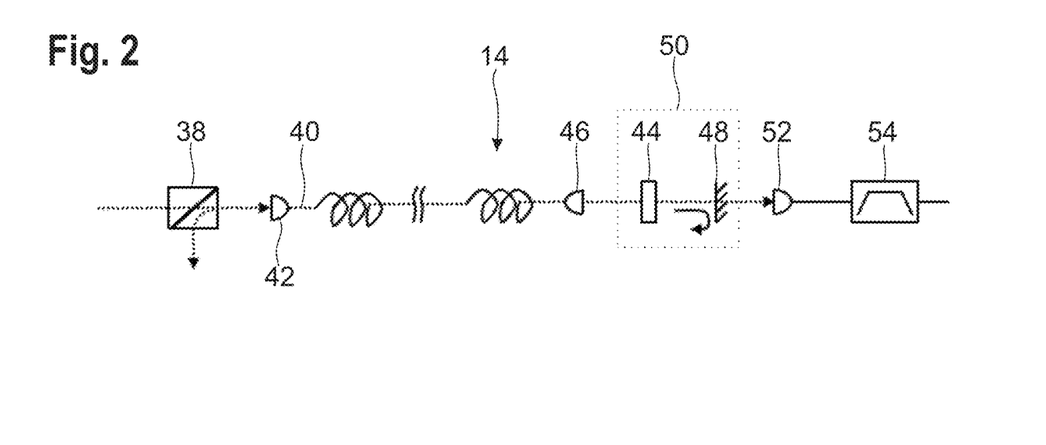
FIG. 2 schematically shows an embodiment of an optical transport module of the RF-over-fiber system of FIG. 1, FIG. 3 schematically shows an embodiment of a sampling module of the RF-over-fiber system of FIG. 1.

FIG. 2 schematically shows one embodiment of the optical transport modules 14 in more detail. While it is, in principle, possible that the optical transport modules 14 are configured different from each other, it is assumed in the following that all optical transport modules 14 are configured functionally identical.

In the embodiment shown in FIG. 2, the optical transport module 14 comprises a beam splitter 38 that is established as a polarization beam splitter (PBS). The beam splitter 38 is connected to the optical signal module 12, more precisely to the beam distributor 30, so as to receive the amplitude-modulated optical signal that is outputted by the optical signal module 12, for example by the electro-optic modulator 26.

The beam splitter 38 is generally capable of separating forward travelling waves, namely waves travelling in the first direction, and backward travelling waves, namely waves travelling in the opposite direction, based on polarization. Accordingly, the beam splitter 38 separates backward travelling waves based on their respective polarization such that only those backward travelling waves are split off for further processing that have a certain polarization.

The beam splitter 38 is further connected with one of the sampling circuits 16, such that the sampling circuit 16 receives the respective signal split by the beam splitter 38, namely the backward travelling waves having the certain polarization.

The optical transport module 14 comprises an optical fiber 40 that is connected with the beam splitter 38 downstream of the beam splitter 38 via an interface 42 that may have an anti-reflection coating. The fiber 40 generally maintains the respective polarization of the optical signal that travels along the fiber 40 from the optical signal module 12 to the measurement instrument 22.

The respective optical signal travelling along the fiber from the optical signal module 12 to the measurement instrument 22 passes a polarization rotator 44 that may be established by a wave plate, for instance a lambda/4 wave plate. Hence, the polarization of the optical signal passing the polarization rotator 44 is changed in a defined manner. In other words, the polarization rotator 44 is capable of changing the polarization of the optical signal that passes the polarization rotator 44. For example, if the (modulated) optical signal has a linear polarization of 0° before the polarization rotator 44, the (modulated) optical signal is circular polarized after a single pass of the polarization rotator 44.

In the embodiment shown in FIG. 2, the polarization rotator 44 is located after the fiber 40 namely after an interface 46 between the fiber 40 and the measurement instrument 22. However, the polarization rotator 44 may also be located directly at the end of the fiber 40, namely as part of the interface 46, or within the fiber 40, e.g. in front of the interface 46. In general, the polarization rotator 44 could also be arranged before the fiber 40 at the tip of the fiber 40, namely at the interface 42.

Further, the optical transport module 14 comprises a partially reflecting reflector 48 that may be established by a partially reflecting surface. For instance, the partially reflecting reflector 48 may be a mirror that partially reflects the optical signal impinging thereon.

The polarization rotator 44 and the partially reflecting reflector 48 may be separately formed components or may alternatively be established by a single device 50 as indicated by the box with dotted lines. For instance, the single device 50 may be a Faraday mirror, e.g. an arrangement of a Faraday rotator with a mirror located after the Faraday rotator.

Therefore, the partially reflecting reflector 48 creates a backward travelling wave that travels from the partially reflecting reflector 48 towards the beam splitter 38. In the embodiment shown in FIG. 2, the partially reflecting reflector 48 is located after the fiber 40. However, the partially reflecting reflector 48 can also be located at the end of the fiber 40, namely as part of the interface 46. In any case, the partially reflecting reflector 48 is located after the polarization rotator 44 in terms of the travelling direction of the optical signal originating from the light source 24.

The backward travelling wave created by the partially reflecting reflector 48 travels along the fiber 40 from the partially reflecting reflector 48 towards the beam splitter 38 as mentioned above, thereby passing again the polarization rotator 44 such that the polarization of the reflected optical signal, namely the backward travelling wave, is manipulated again in a defined manner. In case that the polarization rotator 44 is a lambda/4 wave plate, passing the wave plate once forward and once backwards (so all in all a "double pass") gives a phase shift of 90°. Accordingly, if the incoming light is linear polarized in vertical direction the backwards travelling wave after the "double pass" is polarized linearly in horizontal direction. Then, the backward travelling wave has the certain polarization that is used by the beam splitter 38.

The backward travelling wave travels along the (same) fiber 40 towards the beam splitter 38 that processes the backward travelling wave accordingly. As mentioned above, the backward travelling wave that reaches the beam splitter 38 has passed the polarization rotator 44 twice and travelled along the fiber 40 twice. The polarization of the backward travelling wave has a defined polarization that matches with the one of the beam splitter 38 used for splitting. Hence, the beam splitter 38 is enabled to separate the backward travelling wave created by the partially reflecting reflector 48.

Put differently, the beam splitter 38 is enabled to distinguish between a backward travelling wave created by the partially reflecting reflector 48 and a backward travelling wave reflected at other components, for instance at the interface 42, due to the respective polarizations of these backward travelling waves, as only the backward travelling wave reflected at the partially reflecting reflector 48 has passed the polarization rotator 44 twice, thereby having the dedicated polarization that matches with the one used by the beam splitter 38 for splitting.

The beam splitter 38 splits the respective backward travelling wave received from the partially reflecting reflector 48 such that it is inputted into the sampling module 16 associated or rather connected with the respective optical transport module.

The optical transport module 14 further comprises a receiver 52 that is established by a photodiode. The receiver 52 decodes the optical signal received so as to obtain the data transmitted, e.g. the local oscillator signal. The receiver 52 may be located in the vicinity of the measurement instrument 22, for example in the vicinity of the associated (external) frontend 34, in order to keep electric losses at a minimum.

In addition, the optical transport module 14 comprises a (bandpass) filter 54 that is provided after the receiver 52, such that only those frequency portions, e.g. harmonics being of interest are further processed by the measurement instrument 22 or rather the associated (external) frontend 34.

Figure 3:
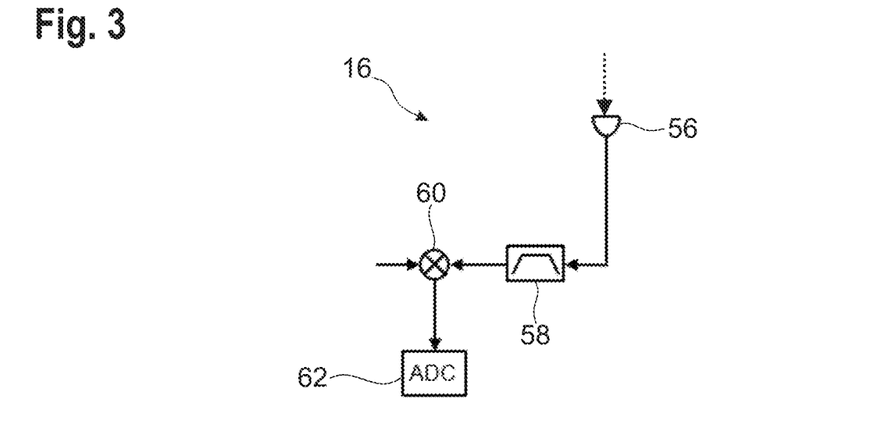

FIG. 3 schematically shows one embodiment of the sampling modules 16 in more detail. The shown sampling module 16 comprises a receiver 56 that is connected with the beam splitter 38 of the associated optical transport module 14, wherein the receiver 56 may be established as a photodiode. Hence, the receiver 56 receives the backward travelling wave, namely the corresponding optical signal, and converts the respective optical signal into an electric signal for further processing.

The sampling module 16 further comprises a (bandpass) filter 58 downstream of the receiver 56, such that only desired frequency portions are further processed by the sampling module 16. In general, the passbands of the (bandpass) filter 54 of the optical transport module 14 and of the (bandpass) filter 58 of the sampling module 16 may be equal or different from each other. For example, the (bandpass) filter 54 of the optical transport module 14 may be configured to let predefined harmonics of the modulated optical signal pass, while the (bandpass) filter 58 of the sampling module 16 may be configured to let a fundamental of the modulated optical signal pass.

The sampling module 16 further comprises a mixer 60 that is provided downstream of the (bandpass) filter 58, wherein the mixer 60 is connected with the (bandpass) filter and with the control module 20. The mixer 60 is configured to mix the electric signal that is filtered by the (bandpass) filter 58 with a local oscillator signal received from the control module 20, thereby obtaining an electric correction signal that is sampled by an analog-to-digital converter 62 provided downstream of the mixer 60.

The mixer 60 may be established as a phase detector, i.e. the mixer 60 may be configured to detect a phase difference between the local oscillator signal and the electric signal filtered by the (bandpass) filter 58. The mixer 60 may be an analog phase detector or a digital phase detector.

The sampled electric correction signal is forwarded to the analysis circuit 18. As already described above, the analysis circuit 18 is configured to correct the measurement data obtained by the measurement instrument 22 based on the electric correction signals received from the sampling modules 16, or more precisely from the analog-to-digital converters 62 of the sampling modules 16.

The analysis circuit 18 comprises a plurality of subtraction circuits 64, wherein each subtraction circuit 64 is connected with one of the sampling modules 16, respectively, such that the subtraction circuits 64 receive the sampled electric correction signals from the connected sampling modules 16.

Figure 4:
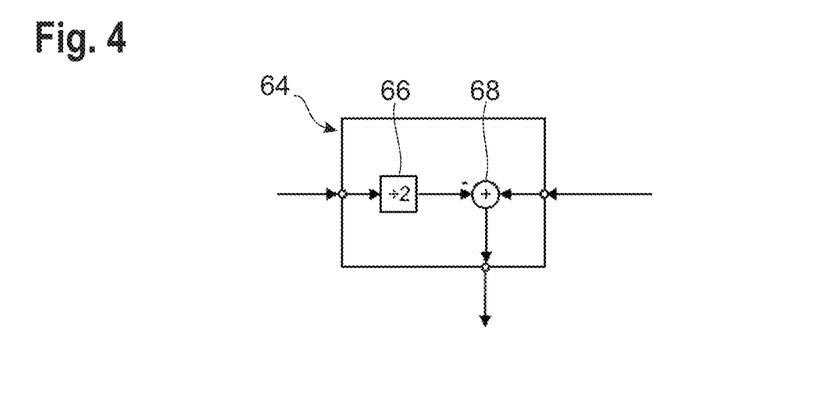
FIG. 4 schematically shows an embodiment of a subtraction circuit of the RF-over-fiber system of FIG. 1.

FIG. 4 shows one embodiment of the subtraction circuits 64 in more detail. The shown subtraction circuit 64 comprises a divider circuit 66, wherein the divider circuit 66 is connected to the associated sampling module 16 downstream of the sampling module 16. The divider circuit 66 is configured to divide the (digitized) electric correction signal by two.

As already mentioned above, the modulated optical signal travels through the fiber 40 twice before being processed by the sampling module 16. Thus, the backward travelling wave processed by the sampling module 16 in total has picked up double the phase drift of the reference signal used by the measurement instrument 22. The divider circuit 66 compensates this effect by dividing the electric correction signal by two.

The subtraction circuit 64 further comprises a subtraction unit 68, wherein the subtraction unit 68 is configured to subtract the electric correction signal from the measurement data obtained by the measurement instrument 22, more precisely from the measured phases, i.e. the phase data comprised in the measurement data, thereby obtaining corrected phase data.

The analysis circuit 18 further comprises an evaluation circuit 70 that is connected to the subtraction units 68 downstream of the subtraction units 68. The evaluation circuit 70 may be established as an integrated circuit that is configured to perform the functionalities described hereinafter. Alternatively, the evaluation circuit 70 may be established by a separately formed device, such as a measurement instrument or a computer.

The evaluation circuit 70 is configured to correct the measurement data obtained by the measurement instrument 22 based on the corrected phase data received from the subtraction units 68. More precisely, the measurement data obtained via each of the (external) frontends 34 may be (individually) corrected by the evaluation circuit 70 based on the respectively associated corrected phase data.

Figure 5:
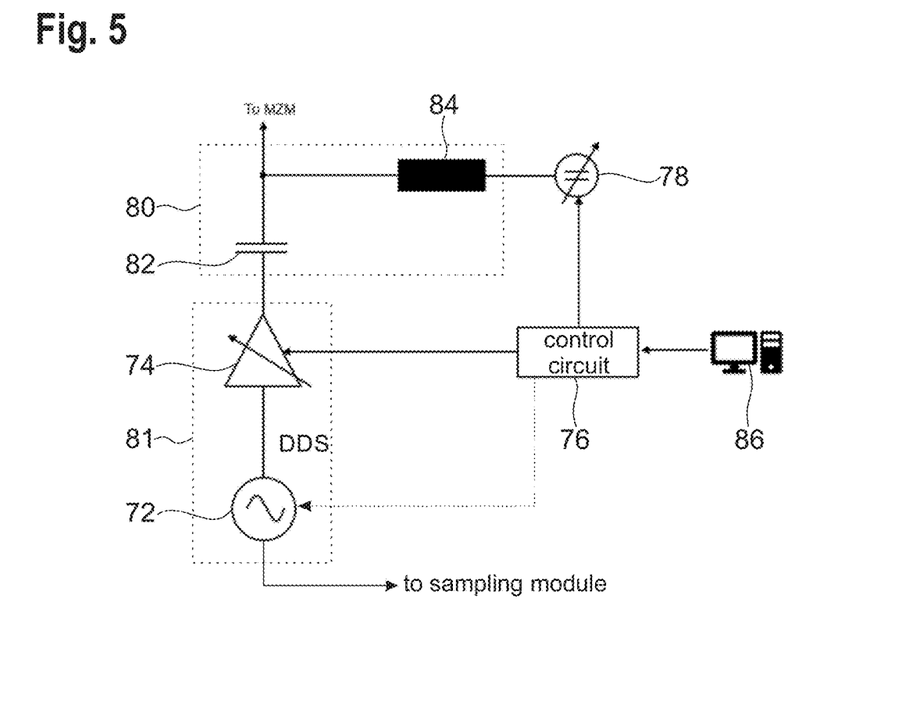
FIG. 5 schematically shows an embodiment of a control module of the RF-over-fiber system of FIG. 1.

FIG. 5 shows an embodiment of the control module 20 in more detail. The control module 20 comprises an RF signal source 72, an amplitude adjustment circuit 74, a control circuit 76, a DC signal source 78, and a signal superposition circuit 80.

The RF signal source 72 is configured to generate an RF signal having a predefined frequency, namely the local oscillator signal described above. In some embodiments, the frequency of the RF signal may be controlled by the control circuit 76. For example, the RF signal source 72 is established as a voltage-controlled oscillator.

The RF signal source is connected to the sampling modules 16, such that the sampling modules 16 receive the local oscillator signal, i.e. the RF signal generated by the RF signal source 72. Further, the amplitude adjustment circuit 74 is connected to the RF signal source 72 so as to receive the RF signal generated by the RF signal source 72.

In general, the amplitude adjustment circuit 74 is configured to amplify and/or attenuate the RF signal, thereby obtaining an adjusted RF signal having a predefined amplitude. In some embodiments, the amplitude of the adjusted RF signal may be controlled by the control circuit 76. For example, the amplitude adjustment circuit 74 comprises at least one of a VVA, a VGA, an attenuator, or an amplifier.

As is indicated in FIG. 5, the RF signal source 72, for example the RF signal source 72 and the amplitude adjustment circuit 74, may optionally be integrated in a direct signal synthesizer (DDS) 81.

The DC signal source 78 is configured to generate a DC signal having a predefined voltage, which may also be called "bias voltage". In some embodiments, the voltage of the DC signal may be controlled by the control circuit 76.

In general, the signal superposition circuit 80 is configured to superimpose the adjusted RF signal and the DC signal, thereby obtaining the control signal for the electro-optic modulator 26 described above. Therein, the signal superposition circuit 80 comprises a capacitance 82 that is connected with the amplitude adjustment circuit 74. Further, the signal superposition circuit 80 comprises an inductance 84 that is connected with the DC signal source 78. Thus, the control signal corresponds to a superposition of the DC signal received via the inductance 84 and of the RF signal received via the capacitance 82.

As described above, the electro-optic modulator 26 modulates the optical signal by the control signal, thereby obtaining the modulated optical signal described above. By adapting the voltage of the DC signal and/or the amplitude of the adjusted RF signal, the electro-optic modulator 26 can be operated in a non-linear region, which results in the frequency of the modulated optical signal being multiplied by a certain multiplication factor. This effect can be used in order to manipulate the frequency of the RF information comprised in the modulated optical signal, such that the RF information has a target modulation frequency, i.e. a desired modulation frequency.

In some embodiments, the control circuit 76 may receive a target modulation frequency and/or a desired multiplication factor, and may control the voltage of the DC signal, the amplitude of the adjusted RF signal, and/or a frequency of the RF signal such that the target modulation frequency and/or the desired multiplication factor is obtained.

For example, a user may input the target modulation frequency and/or the desired multiplication factor via a user interface of an external computer device 86. The target modulation frequency and/or the desired multiplication factor may then be forwarded from the external computer device 86 to the control circuit 76. The external computer device 86 may be established as a personal computer, as a laptop, as a smartphone, or as a microcontroller, for example.

The control of voltage of the DC signal, the amplitude of the adjusted RF signal, and/or the frequency of the RF signal is explicitly explained in more detail hereinafter for the example of a MZM. However, it is to be understood that the same type of derivation can be done for any other suitable type of electro-optic modulator.

The electro-optic modulator 26 being an MZM has the following transfer function T(U):

$$\mathcal{T}(U) = \cos^2\left(\varphi_0 - \frac{\pi}{2}\cdot\frac{U}{U_\pi}\right).$$

wherein $\varphi_0$ and $U_\pi$ are parameters of the MZM. Further, U is the voltage applied to the electro-optic modulator 26, i.e. the voltage of the control signal.

The control signal corresponds to a superposition of the voltage $U_0$ of the DC signal with the adjusted RF signal having amplitude $\alpha$, frequency $\omega$ and phase $\phi_0$. Thus, the control signal is described by the equation $$U(t)=U_0+\alpha\cdot\sin(\omega t+\phi_0).$$

It is noted that the amplitude $\alpha$ can be set by appropriately controlling the amplitude adjustment circuit 74, while the voltage $U_0$ can be set by appropriately controlling the DC signal source 78.

The transfer function T(U) can be rewritten as $$\mathcal{T}(t)=\cos^2(a-b\cdot\sin(\omega t+\phi_0))$$

with $$a = \varphi_0 + \frac{\pi}{2}\frac{U_0}{U_\pi},\ b = \frac{\pi\alpha}{2U_\pi}.$$

As can be seen from the equation defining the transfer function T(t), the transfer function is $2\pi/\omega$-periodic. Accordingly, the spectrum of the modulated optical signal can be determined by a discrete Fourier series expansion.

The amplitudes $c_k \in \mathbb{C}$ ($k \in \mathbb{Z}$) are then given by $$c_k = \frac{1}{T}\int_0^T \exp ik\omega t\cdot \mathcal{T}(t)dt$$
$$= \frac{\omega}{2\pi}\int_0^{2\pi/\omega} \exp ik\omega t\cdot \cos^2(a-b\cdot\sin(\omega t+\phi_0))dt.$$

The integral can be explicitly evaluated, which gives the following result for the amplitudes $c_k$:

$$c_k = \begin{cases} 1/2\cdot[1+\cos 2a\cdot J_0(2b)], & k=0 \\ \exp -ik\phi_0\cdot\cos 2a\cdot J_k(2b), & k\in 2\mathbb{N}\setminus\{0\} \\ -i\cdot\exp -ik\phi_0\cdot\sin 2a\cdot J_k(2b), & k\in 2\mathbb{N}+1 \end{cases}$$

wherein $J_k$ denotes the Bessel function of the first kind. This results in the following real-valued amplitudes $\alpha_k=|c_k|$ and associated phases $\vartheta_k$:

$$\alpha_k = \begin{cases} \frac{1}{2}\cdot\left|1+\cos\left[2\left(\varphi_0+\frac{\pi}{2}\frac{U_0}{U_\pi}\right)\right]\cdot J_0\left(\frac{\pi\alpha}{U_\pi}\right)\right|, & k=0 \\ \left|\cos\left[2\left(\varphi_0+\frac{\pi}{2}\frac{U_0}{U_\pi}\right)\right]\cdot J_k\left(\frac{\pi\alpha}{U_\pi}\right)\right|, & k\in 2\mathbb{N}\setminus\{0\} \\ \left|\sin\left[2\left(\varphi_0+\frac{\pi}{2}\frac{U_0}{U_\pi}\right)\right]\cdot J_k\left(\frac{\pi\alpha}{U_\pi}\right)\right|, & k\in 2\mathbb{N}+1 \end{cases}$$

$$\vartheta_k = \begin{cases} 0, & k=0 \\ -k\phi_0-\pi/2\cdot\left[\text{sgn}\left\{\cos\left[2\left(\varphi_0+\frac{\pi}{2}\frac{U_0}{U_\pi}\right)\right]\cdot J_k\left(\frac{\pi\alpha}{U_\pi}\right)\right\}-1\right], & k\in 2\mathbb{N}\setminus\{0\} \\ -k\phi_0-\pi/2\cdot\text{sgn}\left\{\sin\left[2\left(\varphi_0+\frac{\pi}{2}\frac{U_0}{U_\pi}\right)\right]\cdot J_k\left(\frac{\pi\alpha}{U_\pi}\right)\right\}, & k\in 2\mathbb{N}+1 \end{cases}$$

In general, it is desirable to operate the electro-optic modulator 26 with the amplitude of the modulated signal being as close as possible to the maximum possible value.

In general, the maximum possible amplitudes $\tilde{\alpha}_k$ fulfill the following inequality:

$$k < \frac{\pi\tilde{\alpha}_k}{U_\pi} < j_{k,1},$$

wherein $j_{k,1}$ is the first root of the Bessel function $J_k$. This inequality can be used for a numeric search for the maximum possible values $\tilde{\alpha}_k$ of the amplitudes $\alpha_k$. The results for k=1 to k=10 are summarized in the following table:

| k | $j'_{k,1}$ | $\tilde{\alpha}_k/U_\pi$ | max$\|c^k\|^2$ |
|---|---|---|---|
| 1 | 1.841 | 0.586 | $0.339\sin^2 2\left(\varphi_0 + \frac{\pi}{2}\frac{U_0}{U_\pi}\right)$ |
| 2 | 3.054 | 0.971 | $0.236\cos^2 2\left(\varphi_0 + \frac{\pi}{2}\frac{U_0}{U_\pi}\right)$ |
| 3 | 4.201 | 1.337 | $0.188\sin^2 2\left(\varphi_0 + \frac{\pi}{2}\frac{U_0}{U_\pi}\right)$ |
| 4 | 5.318 | 1.693 | $0.160\cos^2 2\left(\varphi_0 + \frac{\pi}{2}\frac{U_0}{U_\pi}\right)$ |
| 5 | 6.416 | 2.042 | $0.140\sin^2 2\left(\varphi_0 + \frac{\pi}{2}\frac{U_0}{U_\pi}\right)$ |
| 6 | 7.501 | 2.387 | $0.125\cos^2 2\left(\varphi_0 + \frac{\pi}{2}\frac{U_0}{U_\pi}\right)$ |
| 7 | 8.578 | 2.730 | $0.1144\sin^2 2\left(\varphi_0 + \frac{\pi}{2}\frac{U_0}{U_\pi}\right)$ |
| 8 | 9.647 | 3.070 | $0.105\cos^2 2\left(\varphi_0 + \frac{\pi}{2}\frac{U_0}{U_\pi}\right)$ |
| 9 | 10.771 | 3.409 | $0.096\sin^2 2\left(\varphi_0 + \frac{\pi}{2}\frac{U_0}{U_\pi}\right)$ |
| 10 | 11.771 | 3.746 | $0.090\cos^2 2\left(\varphi_0 + \frac{\pi}{2}\frac{U_0}{U_\pi}\right)$ |

Therein, $j'_{k,1}$ is the first root of the first derivative of the Bessel function $J_k$. Further, $|c_k|^2$ corresponds to the resulting power of the modulated optical signal, or more precisely of the corresponding harmonic comprised in the modulated optical signal.

Further, k=1 denotes the fundamental ("first harmonic") of the modulated optical signal, k=2 the second harmonic of the modulated optical signal, etc. Accordingly, k is the multiplication factor.

The maximum power of the modulated optical signal can be determined according to $$\max|c_k|^2 = \begin{cases} \cos^2 2\left(\varphi_0 + \frac{\pi}{2}\frac{U_0}{U_\pi}\right) \cdot J_k^2(j'_{k,1}), & k = 2\mathbb{N}\setminus\{0\} \\ \sin^2 2\left(\varphi_0 + \frac{\pi}{2}\frac{U_0}{U_\pi}\right) \cdot J_k^2(j'_{k,1}), & k = 2\mathbb{N}+1 \end{cases}$$

Thus, in order to obtain the optimum output power, i.e. the maximum power of the modulated optical signal or rather of the respective harmonic, the voltage $U_0$ of the DC signal has to fulfill the following equation:

$$U_0 = \begin{cases} -\frac{2\varphi_0}{\pi} \cdot U_\pi, & k \in 2\mathbb{N}\setminus\{0\} \\ \left(\frac{1}{2} - \frac{2\varphi_0}{\pi}\right) \cdot U_\pi, & k \in 2\mathbb{N}+1 \end{cases}$$

The stability of the power of the modulated optical signal can be analyzed by determining the gradient and the Hesse-matrix of the power $|c_k|^2$.

As it turns out, the output powers of the harmonics k>0 are linearly stable against variations of the bias voltage $U_0$ or modulation amplitudes $\alpha$. Further, the stability of the phases $\vartheta_k$ (cf. the equation above) of the modulated optical signal or rather of the respective harmonics can be analyzed. It is apparent that the phases are stable over wide areas, wherein phase jumps of magnitude $\pi$ occur at certain lines in the parameter space $\mathbb{R} \times \mathbb{R}^+$.

More precisely, the phase jumps occur if the following implicit equation is fulfilled:

$$0 = \begin{cases} \cos 2\left(\varphi_0 + \frac{\pi}{2}\frac{U_0}{U_\pi}\right) \cdot J_k\left(\frac{\pi\alpha}{U_\pi}\right), & k \in 2\mathbb{N}\setminus\{0\} \\ \sin 2\left(\varphi_0 + \frac{\pi}{2}\frac{U_0}{U_\pi}\right) \cdot J_k\left(\frac{\pi\alpha}{U_\pi}\right), & k \in 2\mathbb{N}+1 \end{cases}$$

The phase jumps occur at the following coordinates $(U_0, \alpha)$:

$$(U_0, \alpha) = \begin{cases} ((1/2 + \mathbb{Z} - 2\varphi_0/\pi), j_{k,\mathbb{N}}/\pi) \cdot U_\pi, & k \in 2\mathbb{N}\setminus\{0\} \\ ((\mathbb{Z} - 2\varphi_0/\pi)j_{k,\mathbb{N}}/\pi) \cdot U_\pi, & k \in 2\mathbb{N}+1 \end{cases}$$

Figure 6A:
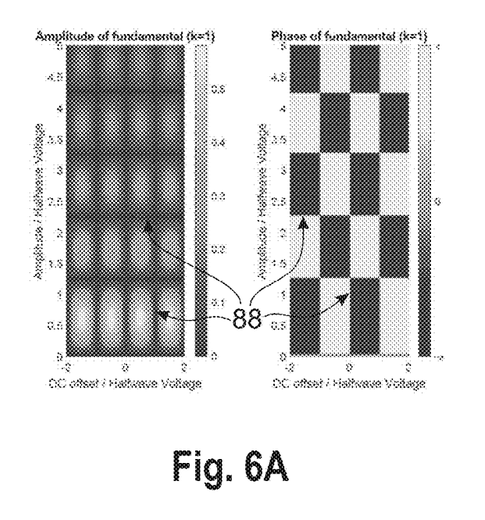
FIG. 6A schematically shows plots of an amplitude and of a phase of a fundamental of a modulated optical signal.
Figure 6B:
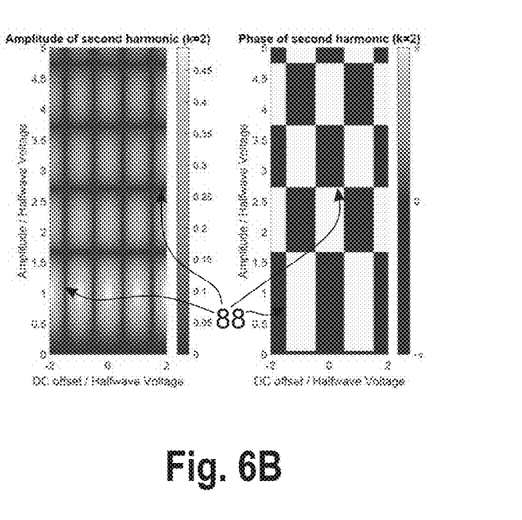
FIG. 6B schematically shows plots of an amplitude and of a phase of a second harmonic of the modulated optical signal.

This is illustrated in FIGS. 6A and 6B, which show exemplary plots of the amplitudes and phases of the fundamental (k=1) and of the second harmonic (k=2) of the modulated optical signal, respectively.

As can clearly be seen on the respective right hand side of FIGS. 6A and 6B, the phase jumps occur only at certain coordinates corresponding to a grid 88 in the ($U_0$, $\alpha$) plane. As long as the operational parameters $U_0$ and $\alpha$ of the DC signal source 78 and of the amplitude adjustment circuit 74 do not cross the lines of the grid 88, no phase jump occurs. Further, as can be seen on the respective left hand side of the FIGS. 6A and 6B, the regions of maximum amplitude a are located in the center of each "cell" of the grid 88.

Thus, by choosing value pairs ($U_0$, $\alpha$) that are located in a center region of a cell of the grid 88, a stable phase and amplitude of the output signal of electro-optic modulator 26, i.e. of the modulated optical signal is guaranteed. Thus, the control circuit 76 may choose an initial value pair ($U_0$, $\alpha$) that is located in a center region of one of the cells of the grid 88.

In some embodiments, the control circuit 76 may determine an allowable voltage range for the DC signal and an allowable amplitude range for the RF signal, and may further set the frequency of the RF signal, such that the desired multiplication factor and/or the target modulation frequency is obtained.

Therein, the control circuit 76 may select the initial value pair ($U_0$, $\alpha$) such that the power of the modulated optical signal (or more precisely of the desired harmonic of the modulated optical signal) is larger than or equal to 75% of the maximum possible power, for example larger than or equal to 85% of the maximum possible power, for example at least 90% or 95% of the maximum possible power.

After the initial value pair ($U_0$, $\alpha$) is set as described above, it is sufficient to control the voltage $U_0$ of the DC signal in order to guarantee a stable phase and amplitude of the modulated optical signal.

Figure 7:
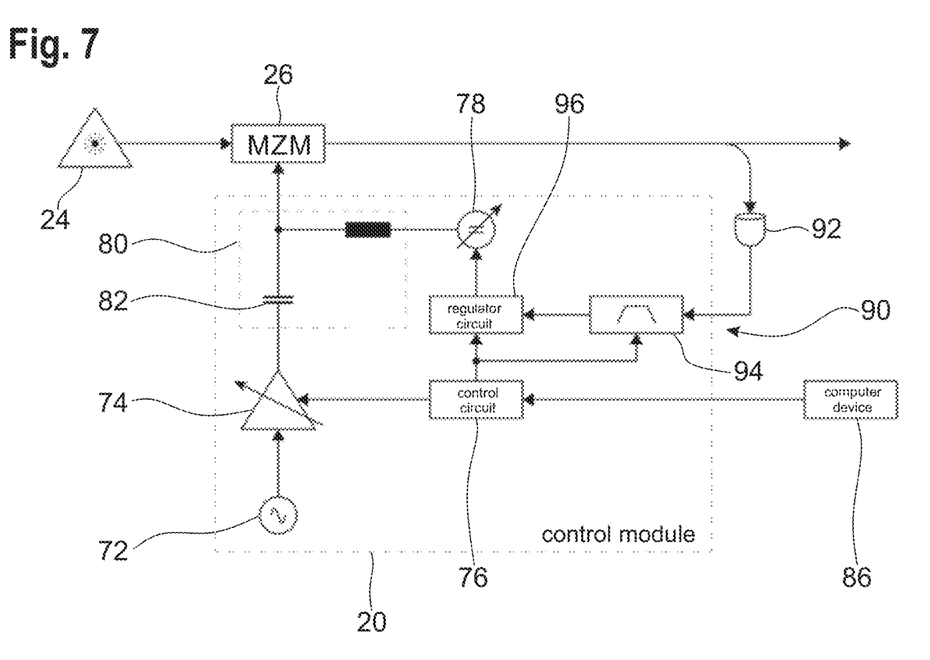
FIG. 7 schematically shows another embodiment of a control module of the RF-over-fiber system of FIG. 1.

In order to enhance the precision of the control of the voltage of the DC signal, the control module may be modified as shown in FIG. 7. In the example embodiment shown in FIG. 7, the control module 20 comprises a control loop 90 for setting the voltage of the DC signal.

In the following, only the differences compared to the first embodiment of the control module 20 described above are explained, wherein like numerals reference elements having like functionality.

The modulated optical signal is fed back into the control loop 90, i.e. the modulated optical signal is received by an optical receiver 92, thereby generating an electrical signal corresponding to the modulated optical signal. The electrical signal is filtered by a bandpass filter 94. The bandpass filter 94 may be tunable, i.e. the filter coefficients of the bandpass filter 94 may be set and/or adapted by the control circuit 76.

The control loop 90 further comprises a regulator circuit 96 that receives the electric signal filtered by the bandpass filter 94 as well as a set value from the control circuit 76. Based on the electric signal and based on the set value, the regulator circuit 96 generates a target voltage for the DC signal source 78, which corresponds to a target voltage for the DC signal.

Certain embodiments disclosed herein include systems, apparatus, components, modules, units, etc., that utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

In some of these embodiments, the functionality described herein can be implemented by special purpose hardware-based computer systems or circuits, etc., or combinations of special purpose hardware and computer instructions. Each of these special purpose hardware-based computer systems or circuits, etc., or combinations of special purpose hardware circuits and computer instructions form specifically configured circuits, machines, apparatus, devices, etc., capable of implemented the functionality described herein.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, embodiments are contemplated in which various steps are performed in parallel, in series, and/or a combination thereof. As such, one of ordinary skill will appreciate that such examples are within the scope of the claimed embodiments. Moveover, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value.

For the purposes of the present disclosure, the phrase "at least one of A and B" is equivalent to "A and/or B" or vice versa, namely "A" alone, "B" alone or "A and B". Similarly, the phrase "at least one of A, B, and C," for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The invention claimed is:

1. A control apparatus for generating a control signal for an electro-optic modulator, the control apparatus comprising:
   an RF signal source being configured to generate a radio frequency (RF) signal;
   an amplitude adjustment circuit being configured to adjust an amplitude of the RF signal, thereby obtaining an adjusted RF signal, wherein the RF signal is at least one of a periodic signal, a non-modulated signal, or a monochromatic signal;
   a DC signal source being configured to generate a direct current (DC) signal;
   a superposition circuit being configured to superimpose the adjusted RF signal and the DC signal, thereby obtaining the control signal for the electro-optic modulator; and
   a control circuit, wherein the control circuit is configured to receive at least one frequency parameter associated with the electro-optic modulator, wherein the at least one frequency parameter comprises a frequency multiplication factor and/or a target modulation frequency, and wherein the control circuit is configured to control the DC signal source to adapt a voltage of the DC signal based on the at least one frequency parameter received.

2. The control apparatus of claim 1, wherein the control circuit is configured to determine an allowable voltage range for the DC signal based on the at least one frequency parameter received.

3. The control apparatus of claim 2, wherein the control circuit is configured to determine the allowable voltage range based on the amplitude of the adjusted RF signal.

4. The control apparatus of claim 2, wherein the allowable voltage range is configured such that a phase of an output signal of the electro-optic modulator is stable over the allowable voltage range.

5. The control apparatus of claim 2, wherein the allowable voltage range is configured such that a power of an output signal of the electro-optic modulator is larger than a predefined threshold over the allowable voltage range.

6. The control apparatus of claim 1, wherein the frequency multiplication factor is an integer.

7. The control apparatus of claim 1, wherein the control circuit is configured to control the RF signal source to adapt a frequency of the RF signal such that a frequency of the control signal multiplied by the multiplication factor is equal to the target modulation frequency.

8. The control apparatus of claim 1, wherein the control circuit is configured to control the amplitude adjustment circuit based on the at least one frequency parameter received.

9. The control apparatus of claim 8, wherein the control circuit is configured to determine an allowable amplitude range for the RF signal based on the at least one frequency parameter received.

10. The control apparatus of claim 9, wherein the allowable amplitude range is configured such that a resulting amplitude of an output signal of the electro-optic modulator is equal to at least 75% of a maximum possible amplitude of the output signal.

11. The control apparatus of claim 1, wherein the RF signal source is established as a voltage controlled oscillator.

12. The control apparatus of claim 1, wherein the amplitude adjustment circuit comprises at least one of a VVA, a VGA, an attenuator, or an amplifier.

13. The control apparatus of claim 1, wherein the RF signal source is integrated in a direct signal synthesizer (DDS) circuit.

14. The control apparatus of claim 1, wherein the superposition circuit comprises a capacitance that is connected with the amplitude adjustment circuit so as to receive the adjusted RF signal.

15. The control apparatus of claim 1, wherein the superposition circuit comprises an inductance that is connected with the DC signal source so as to receive the DC signal.

16. The control apparatus of claim 1, further comprising a control loop for setting the voltage of the DC signal.

17. An optical signal generator apparatus, comprising a control apparatus according to claim 1, a light source, and an electro-optic modulator,
wherein the light source is configured to generate an optical signal, and
wherein the electro-optic modulator is configured to modulate the optical signal based on the control signal provided by the control apparatus, thereby obtaining a modulated optical signal.

18. The optical signal generator apparatus of claim 17, wherein the electro-optic modulator is a Mach-Zehnder modulator (MZM).

19. An RF-over-fiber system, the RF over fiber system comprising an optical signal generator apparatus according to claim 17.

20. A control apparatus for generating a control signal for an electro-optic modulator, the control apparatus comprising:
an RF signal source being configured to generate a radio frequency (RF) signal;
an amplitude adjustment circuit being configured to adjust an amplitude of the RF signal, thereby obtaining an adjusted RF signal;
a DC signal source being configured to generate a direct current (DC) signal;
a superposition circuit being configured to superimpose the adjusted RF signal and the DC signal, thereby obtaining the control signal for the electro-optic modulator; and
a control circuit, wherein the control circuit is configured to receive at least one frequency parameter associated with the electro-optic modulator, wherein the at least one frequency parameter comprises a frequency multiplication factor and/or a target modulation frequency, and wherein the control circuit is configured to control the DC signal source to adapt a voltage of the DC signal based on the at least one frequency parameter received, wherein the control circuit is configured to control the RF signal source to adapt a frequency of the RF signal such that a frequency of the control signal multiplied by the multiplication factor is equal to the target modulation frequency.

* * * * *